United States Patent
Baltazar et al.

(10) Patent No.: US 7,792,872 B1
(45) Date of Patent: *Sep. 7, 2010

(54) WORKFLOW ADMINISTRATION TOOLS AND USER INTERFACES

(75) Inventors: Tina De Hoyos Baltazar, San Antonio, TX (US); Kelly Suzanne McChesney, Grand Prairie, TX (US); Robert Andrew Massie, San Antonio, TX (US); Scott Bureau, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/321,716

(22) Filed: Dec. 29, 2005

(51) Int. Cl.
*G06F 7/00* (2006.01)
*G06F 9/46* (2006.01)
*G06F 15/02* (2006.01)

(52) U.S. Cl. .................. 707/802; 705/8; 705/9

(58) Field of Classification Search ............... 707/102, 707/104
See application file for complete search history.

(56) References Cited

U.S. PATENT DOCUMENTS

| | | | |
|---|---|---|---|
| 5,301,320 A | | 4/1994 | McAtee et al. |
| 5,581,691 A | * | 12/1996 | Hsu et al. .................. 714/15 |
| 5,666,490 A | * | 9/1997 | Gillings et al. ............. 709/238 |
| 5,826,239 A | | 10/1998 | Du et al. |
| 5,999,911 A | | 12/1999 | Berg et al. |
| 6,038,541 A | | 3/2000 | Tokuda et al. |
| 6,151,583 A | | 11/2000 | Ohmura et al. |
| 6,170,002 B1 | | 1/2001 | Ouchi |
| 6,182,121 B1 | * | 1/2001 | Wlaschin ................. 709/215 |
| 6,192,381 B1 | * | 2/2001 | Stiegemeier et al. ....... 715/505 |
| 6,314,425 B1 | | 11/2001 | Serbinis et al. |
| 6,574,617 B1 | * | 6/2003 | Immerman et al. .......... 707/1 |
| 6,604,124 B1 | * | 8/2003 | Archbold .................. 718/103 |
| 6,728,947 B1 | | 4/2004 | Bengston |
| 6,742,026 B1 | * | 5/2004 | Kraenzel et al. ........... 709/222 |
| 6,954,758 B1 | | 10/2005 | O'Flaherty et al. |
| 6,985,922 B1 | * | 1/2006 | Bashen et al. ............. 709/203 |
| 6,990,636 B2 | | 1/2006 | Beauchamp et al. |
| 7,043,486 B2 | * | 5/2006 | Cope ....................... 707/100 |
| 7,100,147 B2 | | 8/2006 | Miller et al. |
| 7,107,226 B1 | * | 9/2006 | Cassidy et al. ............. 705/26 |
| 7,143,091 B2 | * | 11/2006 | Charnock et al. ........... 707/5 |
| 7,272,616 B1 | | 9/2007 | McKinnon |
| 7,289,964 B1 | * | 10/2007 | Bowman-Amuah ........... 705/1 |
| 7,302,431 B1 | | 11/2007 | Apollonsky et al. |
| 7,392,210 B1 | | 6/2008 | MacKay et al. |
| 2002/0007300 A1 | | 1/2002 | Slatter |
| 2002/0035584 A1 | | 3/2002 | Scheier et al. |

(Continued)

OTHER PUBLICATIONS

HP, "Monitoring and execution for contract compliance", Oct. 10, 2005.*

(Continued)

*Primary Examiner*—Neveen Abel Jalil
*Assistant Examiner*—Tarek Chbouki
(74) *Attorney, Agent, or Firm*—Brooks, Cameron & Huebsch, PLLC

(57) ABSTRACT

Various embodiments include systems, methods, and user interfaces that provide abilities to administer data in a workflow system. In some embodiments, the workflow system is a portion of a larger system, such as a document management system.

19 Claims, 10 Drawing Sheets

U.S. PATENT DOCUMENTS

| | | | |
|---|---|---|---|
| 2002/0065777 A1* | 5/2002 | Kondo et al. ............... 705/54 |
| 2002/0138321 A1 | 9/2002 | Yuan et al. |
| 2002/0161733 A1* | 10/2002 | Grainger ................. 706/45 |
| 2002/0174010 A1* | 11/2002 | Rice, III ................. 705/14 |
| 2002/0184233 A1 | 12/2002 | Schneider |
| 2002/0184250 A1* | 12/2002 | Kern et al. ............... 707/204 |
| 2003/0004770 A1 | 1/2003 | Miller et al. |
| 2003/0061266 A1 | 3/2003 | Ouchi |
| 2003/0074302 A1* | 4/2003 | Cope ................... 705/37 |
| 2003/0078874 A1* | 4/2003 | Cope ................... 705/37 |
| 2003/0083910 A1 | 5/2003 | Sayal et al. |
| 2003/0126137 A1 | 7/2003 | McFadden |
| 2003/0142128 A1 | 7/2003 | Reulein et al. |
| 2003/0179241 A1 | 9/2003 | Nonaka et al. |
| 2004/0010754 A1 | 1/2004 | Jones |
| 2004/0068728 A1* | 4/2004 | Blevins ................. 718/100 |
| 2004/0074961 A1 | 4/2004 | Hull et al. |
| 2004/0088647 A1* | 5/2004 | Miller et al. ............ 715/500 |
| 2004/0125402 A1* | 7/2004 | Kanai et al. ............. 358/1.15 |
| 2004/0205136 A1 | 10/2004 | Whittenberger et al. |
| 2004/0221261 A1* | 11/2004 | Blevins ................. 717/107 |
| 2004/0252319 A1* | 12/2004 | Gorp et al. ............. 358/1.13 |
| 2005/0027544 A1* | 2/2005 | Newstead et al. ........... 705/1 |
| 2005/0044129 A1* | 2/2005 | McCormack et al. ....... 709/200 |
| 2005/0066287 A1 | 3/2005 | Tattrie et al. |
| 2005/0076049 A1 | 4/2005 | Qubti et al. |
| 2005/0086257 A1* | 4/2005 | Wright ................. 707/103 R |
| 2005/0138554 A1* | 6/2005 | Bell et al. ............... 715/530 |
| 2005/0177483 A1* | 8/2005 | Napier et al. ............ 705/35 |
| 2005/0187872 A1 | 8/2005 | Schmidt et al. |
| 2005/0198025 A1 | 9/2005 | Matsuno |
| 2005/0203718 A1* | 9/2005 | Carek et al. ............. 703/1 |
| 2005/0223008 A1 | 10/2005 | Kubota et al. |
| 2005/0228683 A1 | 10/2005 | Saylor et al. |
| 2005/0246629 A1* | 11/2005 | Hu ................... 715/513 |
| 2005/0273272 A1* | 12/2005 | Brando et al. ............. 702/19 |
| 2006/0036467 A1 | 2/2006 | Tarr et al. |
| 2006/0053120 A1 | 3/2006 | Shum et al. |
| 2006/0059162 A1* | 3/2006 | Rizk et al. ............... 707/10 |
| 2006/0069596 A1* | 3/2006 | Hatoun et al. ............. 705/7 |
| 2006/0069605 A1* | 3/2006 | Hatoun ................. 705/9 |
| 2006/0111953 A1* | 5/2006 | Setya ................... 705/8 |
| 2006/0161562 A1* | 7/2006 | McFarland et al. .......... 707/100 |
| 2006/0190575 A1* | 8/2006 | Harvey et al. ............. 709/222 |
| 2006/0195575 A1 | 8/2006 | Delany et al. |
| 2006/0200476 A1 | 9/2006 | Gottumukkala et al. |
| 2006/0206890 A1 | 9/2006 | Shenfield et al. |
| 2006/0251047 A1* | 11/2006 | Shenfield et al. ............ 370/351 |
| 2007/0038499 A1* | 2/2007 | Margulies et al. ............. 705/9 |
| 2007/0100765 A1 | 5/2007 | Naganuma |
| 2007/0118648 A1* | 5/2007 | Millefiorini et al. ......... 709/225 |
| 2007/0208587 A1* | 9/2007 | Sitaraman ................. 705/1 |
| 2007/0250600 A1* | 10/2007 | Freese et al. .............. 709/219 |
| 2008/0147474 A1 | 6/2008 | Mangtani et al. |

OTHER PUBLICATIONS http://web.archive.org/web/20040202041322/http://www.callscripter.com/, (Feb. 2, 2004),1 p.

*SWiNG: Automated Workflow Suite*, product brochure, DALiM Software GmbH, Kehl, Germany, obtained from http://www.zenplex.com/pdf/SWiNG_En.pdf,,(Apr. 14, 2006),12 p.

Bertino, E., et al., "The specification and enforcement of authorization constraints in workflow management systems", *ACM Transactions on Information and System Security*, 2, (Feb. 1999),65-104.

Bruno, A., et al., "Supporting interactive workflow systems through graphical web interfaces and interactive simulators", *Proceedings of the 4th International Workshop on Task Models and Diagrams*, Gdansk, Poland,(Sep. 26-27, 2005),63-70.

Combi, C., et al., "Architectures for a temporal workflow management system", *Proceedings of the 2004 ACM Symposium on Applied Computing*, Nicosia, Cyprus,(Mar. 14-17, 2004),659-666.

Ter Linden, M., et al., "GridAssist, a user friendly grid-based workflow management tool", *2005 International Conference Workshop on Parallel Processing*, (2005),5-10.

Heijens, S., *Support for Workflow Administration and Monitoring in the YAWL*, Master Thesis, Vrije Universiteit, Amsterdam, The Netherlands, (Aug. 5, 2005), 129 p.

Luo, H., et al., "CIMFLOW: A workflow management system based on integration platform environment", *Proceedings of the 7th IEEE International Conference on Emerging Technologies and Factory Automation*, vol. 1, (1999), p. 233-238.

\* cited by examiner

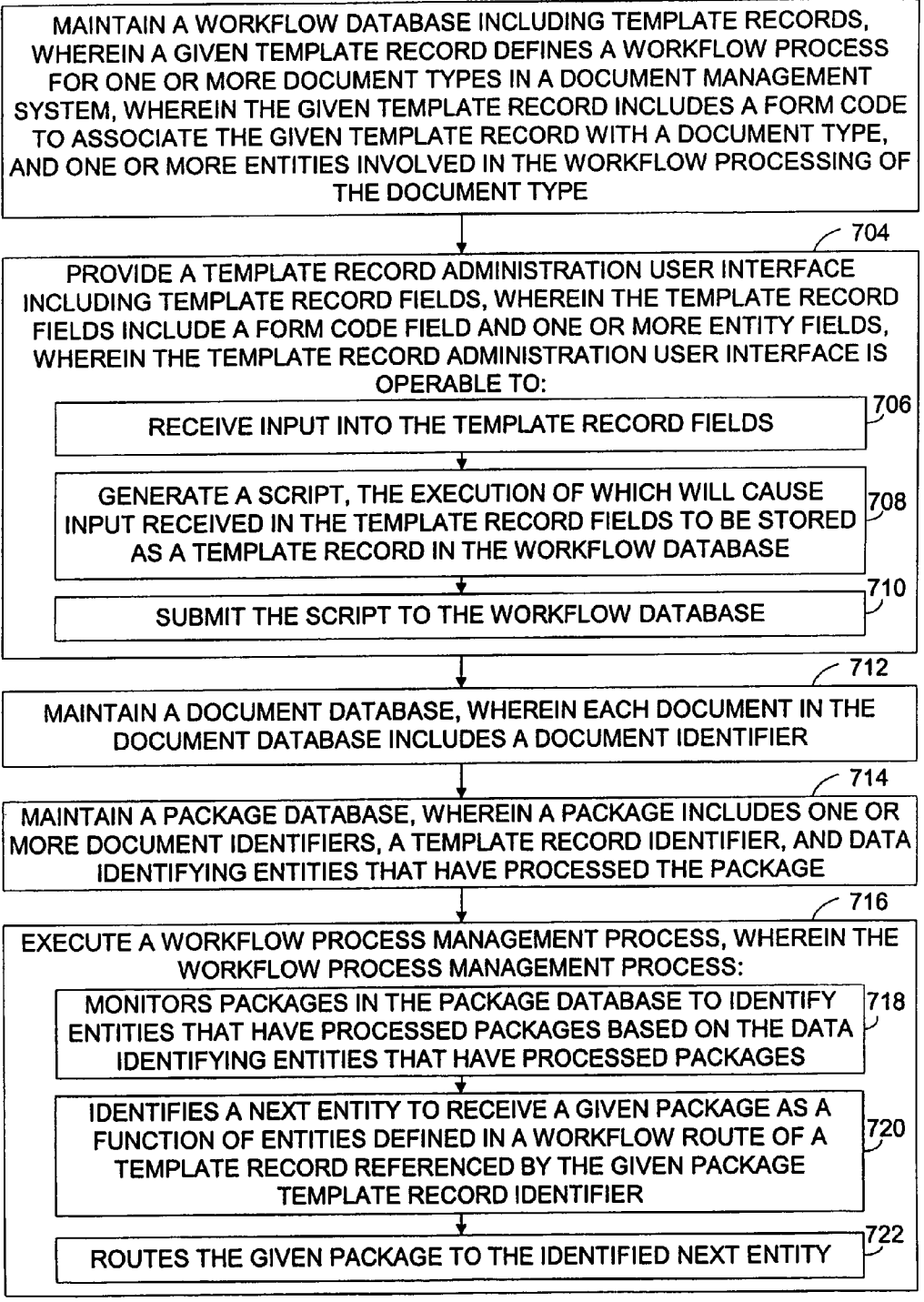

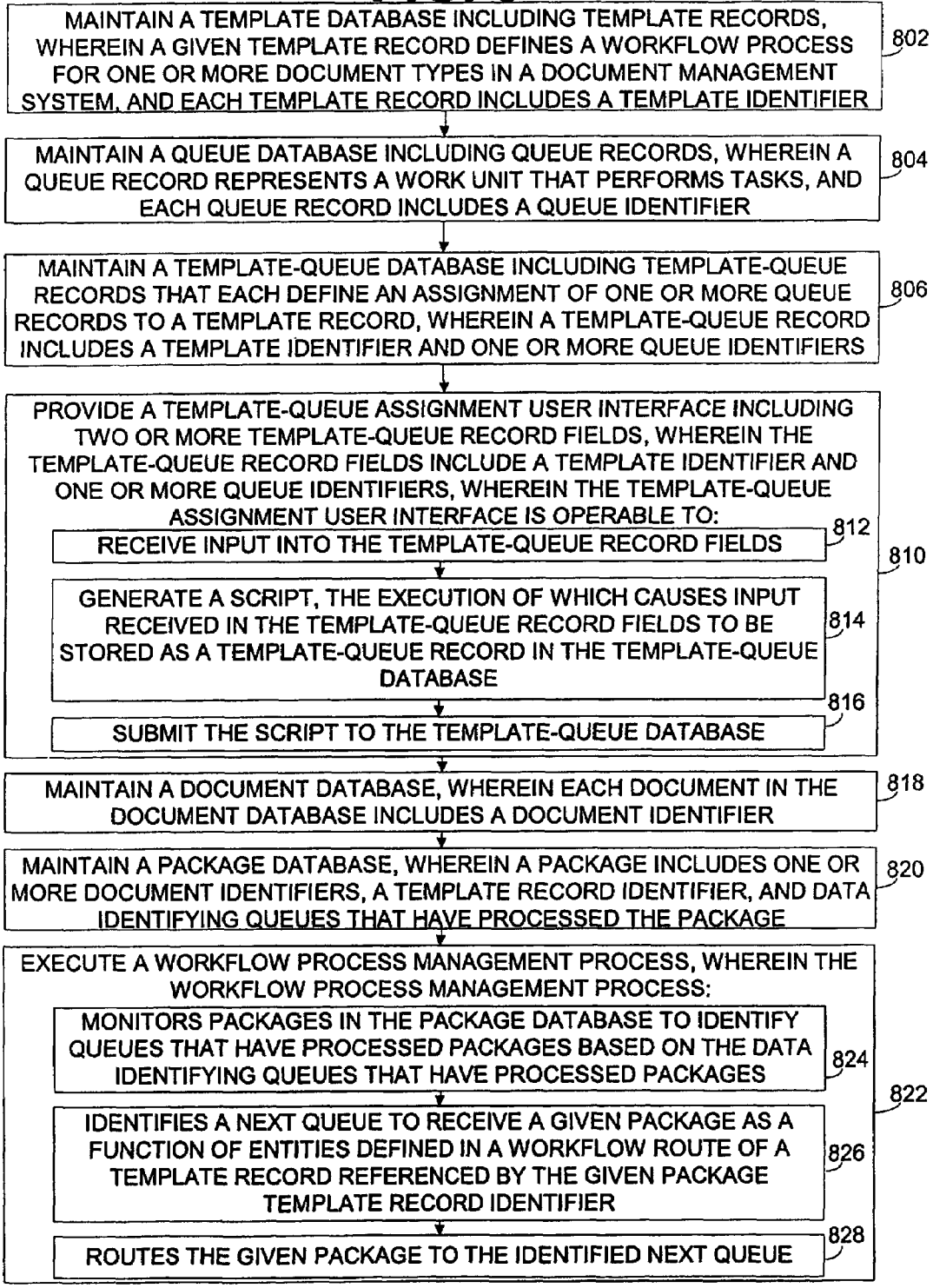

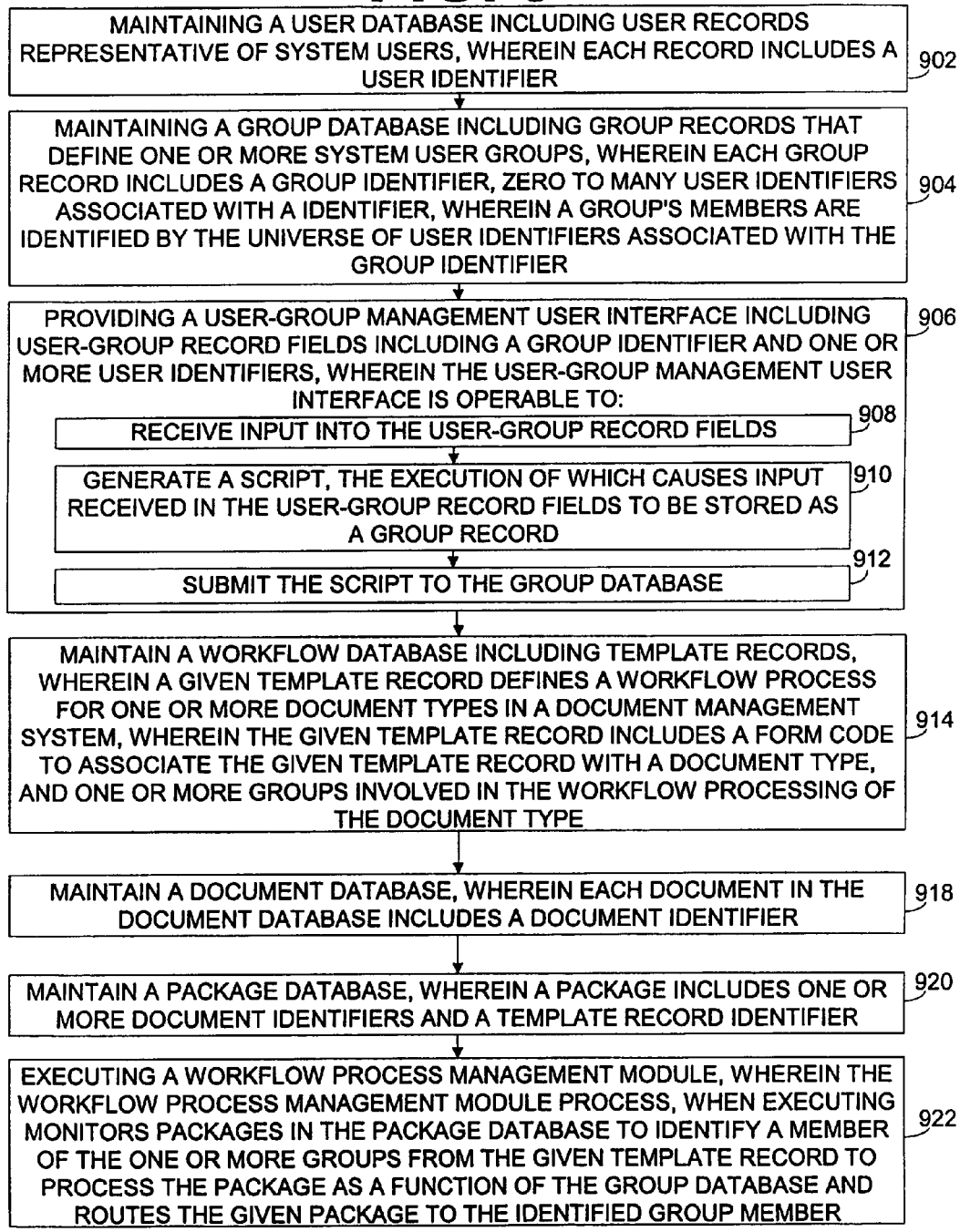

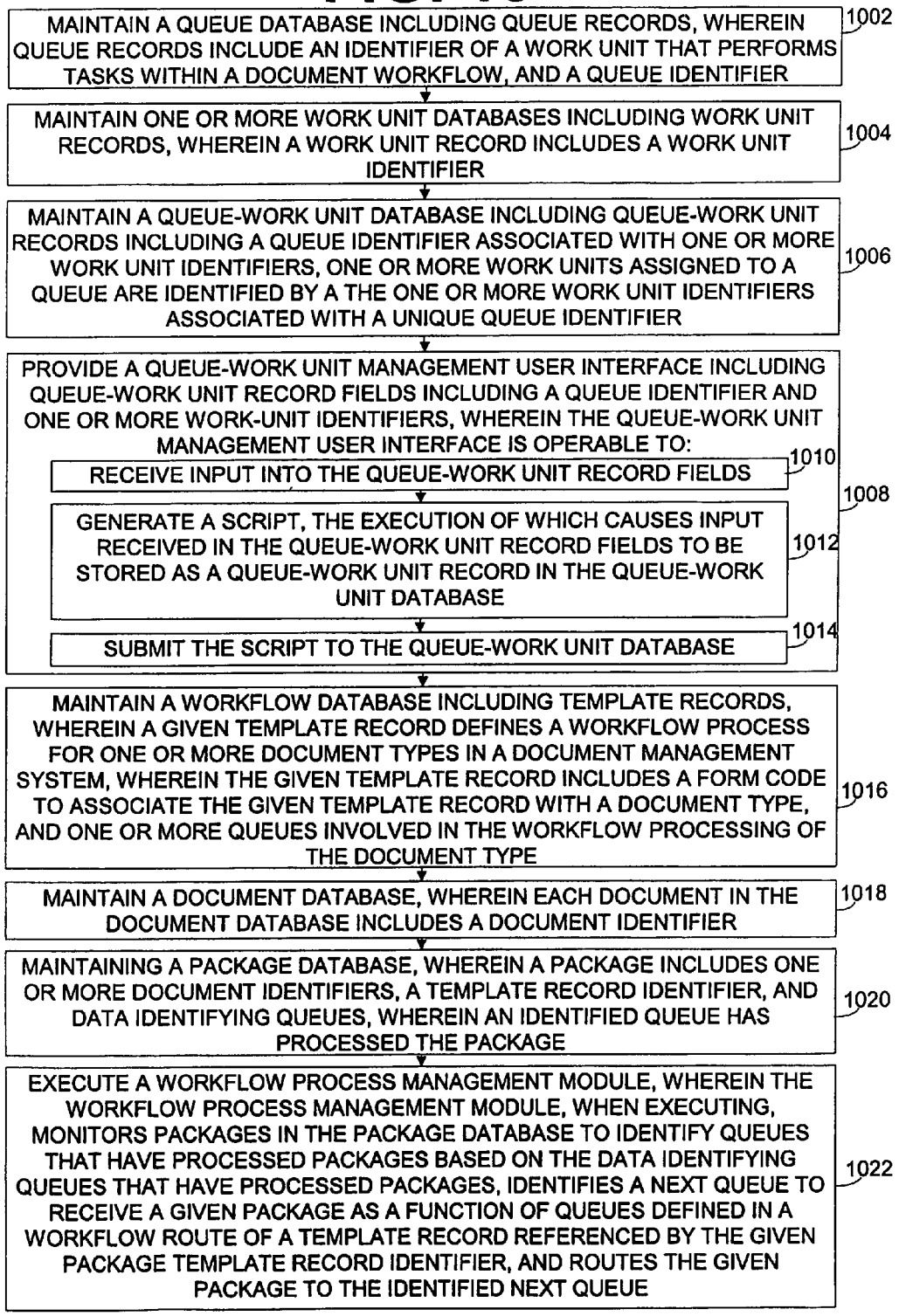

ents of the present subject matter. One such embodiment is described with reference to FIG. 1.

WORKFLOW ADMINISTRATION TOOLS AND USER INTERFACES

RELATED APPLICATIONS

This disclosure is related to pending U.S. patent application Ser. No. 11/321,646, titled "WORKFLOW ADMINISTRATION TOOLS AND USER INTERFACES," U.S. patent application Ser. No. 11/321,717, titled "WORKFLOW ADMINISTRATION TOOLS AND USER INTERFACES," and U.S. patent application Ser. No. 11/321,726, titled "WORKFLOW ADMINISTRATION TOOLS AND USER INTERFACES," filed on an even date herewith.

FIELD

The inventive subject mater relates to data processing and, more particularly, workflow administration tools and user interfaces.

BACKGROUND

Business today is process driven. The use of repeatable processes provides a mechanism to ensure high levels of customer service and to provide predictable results. However, business is becoming more and more nimble and the supporting business processes must be equally nimble.

Some business processes are implemented and enabled through use of workflow management systems. Some workflow management systems are part of larger document management systems that enable document workflow processes. Administration of such processes is a complex task and requires complex administration tools. However, due to the complexity of process administration with current administration tools, administration is performed by highly-skilled administrators. This adds overhead and lag-time to implementations of quickly evolving and newly developed business processes. This overhead and lag-time can create unacceptable organizational bottlenecks among other problems.

BRIEF DESCRIPTION OF THE DRAWINGS

FIG. 7 is a block diagram of a method according to an example embodiment.

FIG. 8 is a block diagram of a method according to an example embodiment.

FIG. 9 is a block diagram of a method according to an example embodiment.

FIG. 10 is a block diagram of a method according to an example embodiment.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The subject matter herein provides workflow administration tools and user interfaces to provide organizations with abilities to modify workflow data. These abilities allow organizations to quickly create, read, update, or delete workflow data without having to rely on systems support staff. As a direct result, the processes supported by workflows become more dynamic and allow the business to be more nimble. There are many other benefits provided by various embodiments of the present subject matter. One such embodiment is described with reference to FIG. 1.

Figure 1:
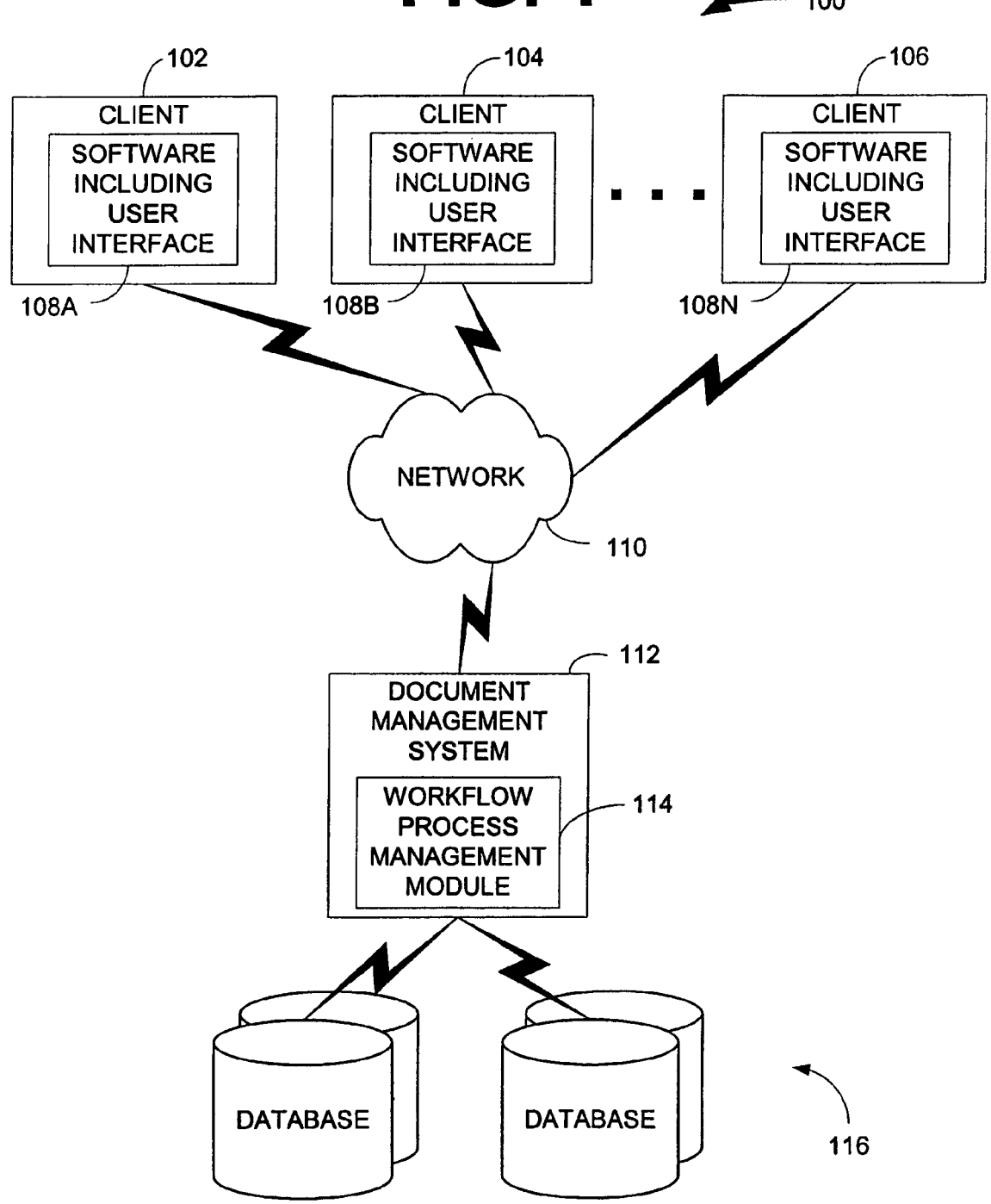
FIG. 1 is a schematic block diagram of a system according to an example embodiment.

FIG. 1 is a schematic block diagram of a system 100 according to an example embodiment. The system 100 includes clients 102, 104, 106. Each client 102, 104, 106 has software including a user interface 108A, 108B, 108C, respectively. The software including a user interface 108 of each client 102, 104, 106 operably connects to a document management system 112 via a network 110.

One example client 102, 104, 106 is in the form of a computer. The client 102, 104, 106 includes an operating system that controls client 102, 104, 106 operation. The client 102, 104, 106 can include a processing unit, memory, removable storage, and non-removable storage. The memory can include volatile memory and non-volatile memory. The client 102, 104, 106 can include—or have access to a computing environment that includes—a variety of computer-readable media, such as volatile memory and non-volatile memory, removable storage and non-removable storage. Client 102, 104, 106 storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing machine-readable instructions. The client 102, 104, 106 can also include or have access to a computing environment that includes input, output, and a communication connections. The client 102, 104, 106 can operate in a networked environment using a communication connection to connect to one or more remote computers, such as another client 102, 104, 106, a document management system 112 server, and other network resources. The communication connection can include a connection to network 110 or one or more other networks.

Machine-readable instructions stored on a machine-readable medium are executable by the processing unit of the client 102, 104, 106. A hard drive, CD-ROM, and RAM are some examples of articles including a machine-readable medium. The term "machine-readable medium" is also used to represent carrier waves on which the software is transmitted. For example, a computer program capable of providing a generic technique to perform access control check for data access and/or for doing an operation on one of the servers in a component object model (COM) based system according to the teachings of the present invention may be included on a CD-ROM and loaded from the CD-ROM to a hard drive. The machine-readable instructions allow the client 102, 104, 106 to provide generic access controls in a COM, TCP/IP, Server Message Block ("SMB"), or other protocol based, or protocol-hybrid, network system having multiple users and servers.

The network 110, in some embodiments, includes a local area network. In various other embodiments, the network 110 includes one or more of a wide area network, a system area network, a virtual private network, a global network, the Internet, and other network types. In some embodiments, the network is a wired network. In other embodiments, the network 110 includes one or more wireless portions.

Document management system 112 is a system to receive, store, and provide documents. In some embodiments, the documents include one or more of electronic documents in a native file format, images of documents, and document data. In some embodiments, the document management system 112 is Documentum, which is available from EMC, Inc. of Hopkinton, Mass. In other embodiments, the document management system 112 is one or more of other commercially available systems, a combination of commercially available systems, and custom developed systems.

The document management system 112, in some embodiments, includes one or more databases 116. The databases 116 store document management system 112 data. In some embodiments, the document management system 112 data includes one or more of document indexing data, document data, document images, document in native document formats, workflow process definitions, document management system 112 user information, user group information, other workflow data, and other data as needed based on the particular embodiment.

In some embodiments, the databases 116 include a relational database. Other embodiments include one or more of a relational database, a hierarchical database, files, folder or directory structures on a storage device such as a network drive, or other data storage system, device, or arrangement.

The software 108A, 108B, 108C, in some embodiments, provides user interfaces to client 102, 104, 108 users, respectively. These software 108A, 108B, 108C user interfaces provide abilities to retrieve, update, delete, and create document management system 112 data that is stored in the databases 116. This data, in some embodiments, defines workflow templates, groups, user assignments to groups, workflow queues, and assignment of users and groups to queues.

In some embodiments, the software 108A, 108B, 108C is a web browser that receives, updates, and deletes database 116 data in response to user actions through the user interfaces from an application server of the document management system 112. In other embodiments, the software 108A, 108B, 108C is a thick client application that connects to the databases 116 via a database connectivity interface such as Object Database Connectivity ("ODBC") or Java Database Connectivity ("JDBC"). Further details of these user interfaces are provided below.

In some embodiments of the system 100, the document management system 112 includes a workflow process management module 114. In some embodiments, the work flow process management module 114 monitors workflows within the document management system 112, identifies individuals, groups, or entities that need to perform an action in one or more workflows, and routes documents, packages including documents and other data, or messages to appropriate queues.

Figure 2:
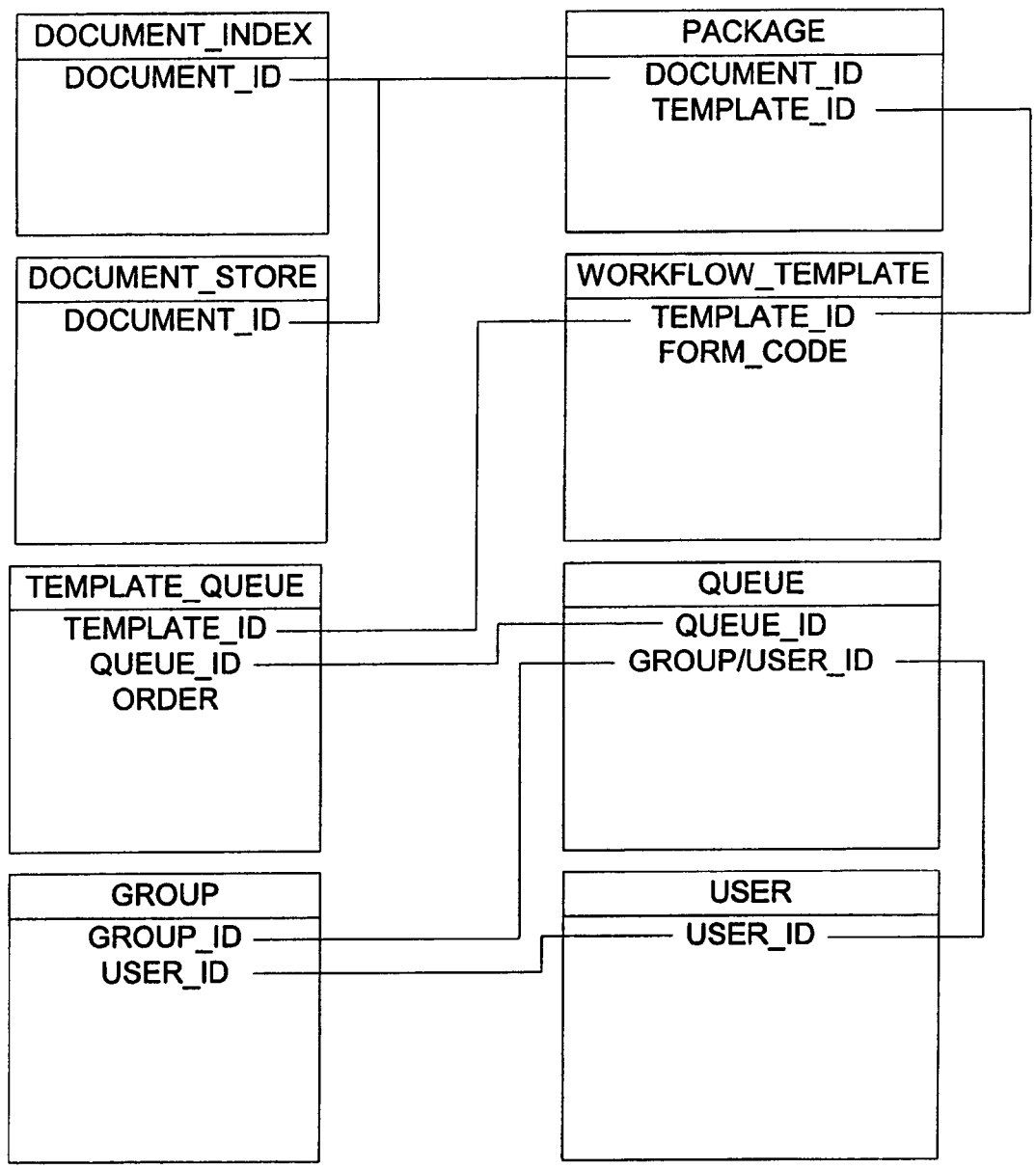
FIG. 2 is a data diagram of tables within one or more databases according to an example embodiment.

FIG. 2 is a data diagram 200 of tables within one or more databases, such as databases 116 of FIG. 1, according to an example embodiment. The data diagram 200 includes tables DOCUMENT_INDEX, DOCUMENT_STORE, TEMPLATE_QUEUE, GROUP, PACKAGE, WORKFLOW_TEMPLATE, QUEUE, AND USER.

The DOCUMENT_INDEX table includes a field DOCUMENT_ID of a document in the DOCUMENT_STORE table. The DOCUMENT_INDEX, in some embodiment, further includes metadata describing the document. This metadata can include data identifying a document type, an account the document relates to, an author of the document, a date the document was created, a date the document was last updated and by whom, and other data describing the document, its purpose, or other reasons and data as required based on the particular embodiment.

The DOCUMENT_STORE table includes a document and a DOCUMENT_ID. Although illustrated as a table, the DOCUMENT_STORE in some embodiments, is a file and the DOCUMENT_ID is a unique file name.

The PACKAGE table defines packages in a workflow. A PACKAGE record defines a document needing actions performed to it, with it, or in response to it in a workflow. A PACKAGE record, in some embodiments includes a DOCUMENT_ID, that relates a document to the package, and a TEMPLATE_ID relating a WORKFLOW_TEMPLATE record to the package. In some embodiments, a PACKAGE record further includes various other data. Some such data can include data identifying actions performed or to be performed, who did or will perform an action, deadlines by which certain actions need to be performed, and other data as needed within a particular embodiment to facilitate or record a process of actions performed in a document workflow.

The WORKFLOW_TEMPLATE table defines template workflows. A WORKFLOW_TEMPLATE record ties a document type to a template of workflow actions for the document type. A WORKFLOW_TEMPLATE record includes a TEMPLATE_ID, to uniquely identify a WORKFLOW_TEMPLATE record, and a FORM_CODE, to tie a template record to a specific document type. A WORKFLOW_TEMPLATE record include further data to identify queue that need to process the document type or other actions as necessary based on the particular embodiment and the particular document type. In some embodiments, when a document is scanned, or otherwise imported to a document management system, the document includes a FORM_CODE. That FORM_CODE is used by the document management system to identify a WORKFLOW_TEMPLATE to assign to the document in a PACKAGE record. The PACKAGE record then is used by the workflow portion of a document management system to route the document as defined within the associated WORKFLOW_TEMPLATE record.

The QUEUE table defines queue to which packages can be routed. A QUEUE record includes a unique QUEUE_ID and a GROUP_ID from the GROUP table or a USER JD from the USER table. A QUEUE record can also include other data such as a description, rules for assignment to a specific user or group member to route certain work to, and other data as needed based on the specific embodiment.

The TEMPLATE_QUEUE table associates QUEUE records to WORKFLOW_TEMPLATE records. Such associations identify one or more queues to route a package to. Thus, a TEMPLATE_QUEUE record includes a QUEUE_ID from the QUEUE table and a TEMPLATE_ID from the WORKFLOW_TEMPLATE table. In some embodiments, TEMPLATE_QUEUE records include an ORDER column. The ORDER column, in such embodiments, identifies a workflow order for routing packages through queues. Some such orders include simultaneous routing to two or more queues.

The USER table identifies system user with a unique USER JD. A USER record can include further information as needed by the particular embodiment. In some embodiments, the USER table is a table, or other data structure, of a networked environment.

The GROUP table associates users from the USER table into groups. A GROUP record can also include a group description and other data based on the particular embodiment.

Figure 3:
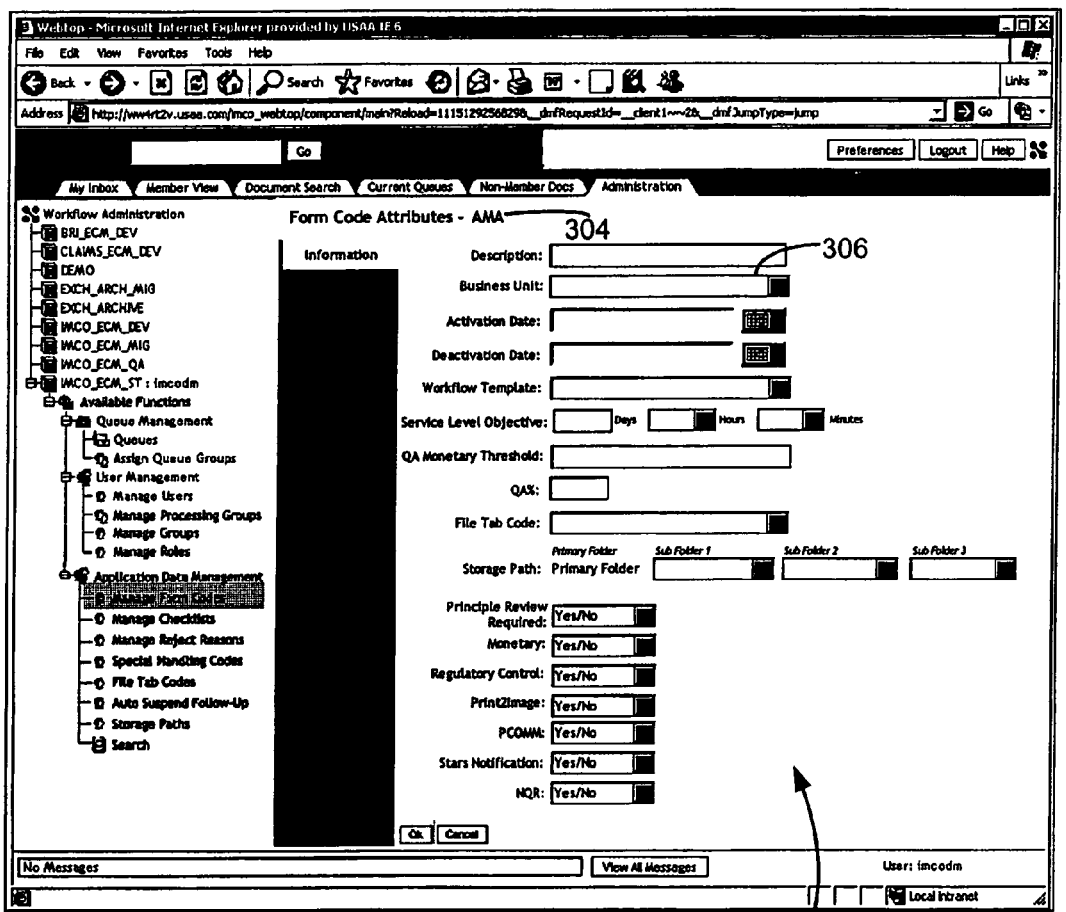
FIG. 3 illustrates a user interface according to an example embodiment.

FIG. 3 illustrates a user interface 300 according to an example embodiment. The user interface 300 provides abilities to administer workflow templates, such as a WORKFLOW_TEMPLATE record of the data diagram 200 illustrated in FIG. 2.

The user interface 300 receives input into it fields 302 and, upon receipt of a command to do so, generates a statement that is executable by a database, such as databases 116 of FIG. 1. The user interface 300 then submits the statement and the data from the fields 302 is stored in the database. In some embodiments, the statement is generated in a query language used by a database management system of the database. In some embodiments, the query language is Structured Query Language ("SQL"). In other embodiments, the query language is a language required by a document management system, such as Documentum Query Language ("DQL").

In some embodiments, the user interface 300 can retrieve workflow template data stored in a database and display the data to a user. In some embodiments, the data is read-only. In other embodiments, the data retrieved by, or into, the user interface 300 is editable by a user.

In some embodiments, the user interface 300 is a template record administration user interface including template record fields, such as fields 302. In some embodiments, the template record fields include a form code field 304 and one or more entity fields 306. In some such embodiments, template record administration user interface is operable to receive input into the fields 302 and generate a script, the execution of which will cause input received in the fields 302 to be stored as a template record in a workflow database. In some embodiments, one or more of the fields 302 include a listing of possible field values that can be selected by a user.

Figure 4:
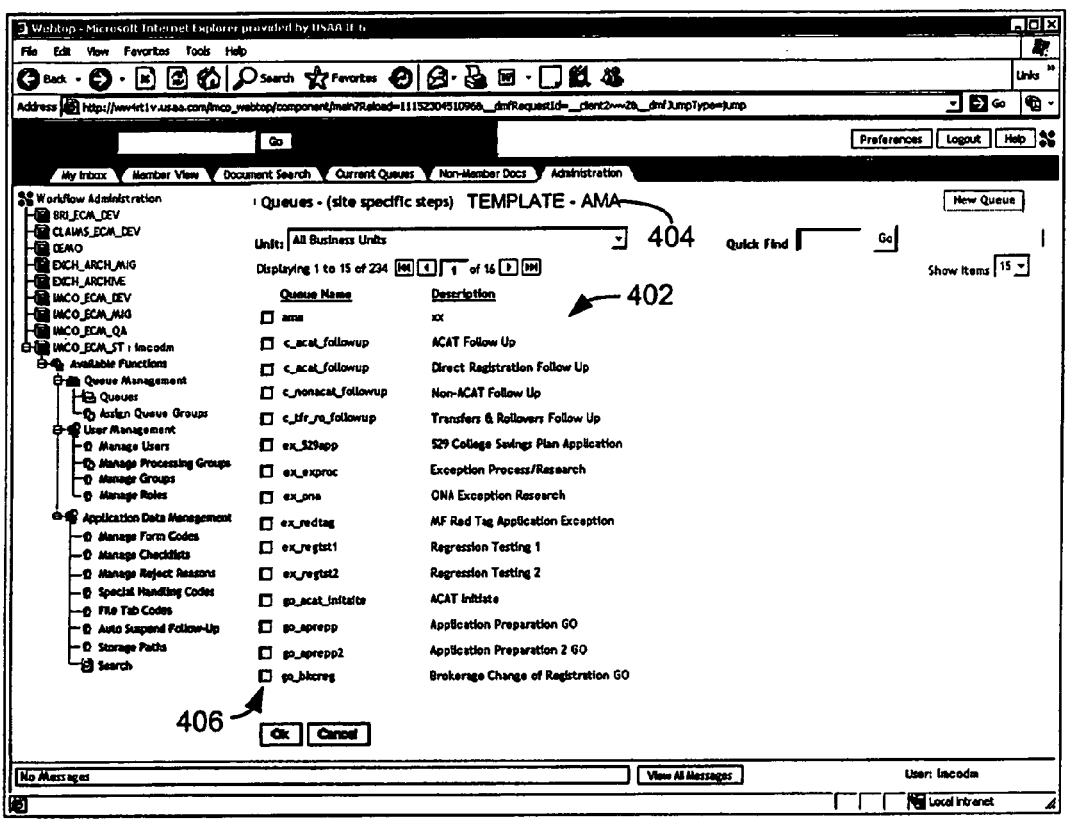
FIG. 4 illustrates a user interface according to an example embodiment.

FIG. 4 illustrates a user interface 400 according to an example embodiment. The user interface 400 provides abilities to create, modify, and delete template queue assignments. A template queue assignment assigns a queue to a template. This user interface 400, in some embodiments, is provided to administer data stored in the TEMPLATE_QUEUE table of the FIG. 2 data diagram.

In some embodiments, the user interface 400 is a template-queue assignment user interface. In some such embodiments, the user interface 400 includes two or more fields such as a template identifier 404 and one or more queue identifiers 402. The user interface 400, is operable to receive input into the fields 402 and generate a statement, the execution of which causes input received in the fields 402 to be stored in database, such as databases 116 of FIG. 1. In some embodiments, the statement is generated in a query language used by a database management system of a database in which the user interface 400 field 402 data is stored. In some embodiments, the query language is Structured Query Language ("SQL"). In other embodiments, the query language is a language required by a document management system, such as Documentum Query Language ("DQL").

In some embodiments, the user interface 400 is operable to retrieve data from a database into the user interface 400. In such embodiment, a user can then edit the data and cause it to be saved back to or deleted from the database.

In some embodiments, the user interface 400 fields 402 include a listing of queues that can be assigned to a template. Some such listings of queues include a selection item 406 with each listed queue. Selection of a selection item 406 causes a listed queue to be assigned to a template identified by the template identifier 404. In some embodiments, the user interface 400 further includes a sequence field to assign a workflow sequence of assigned queues.

Figure 5:
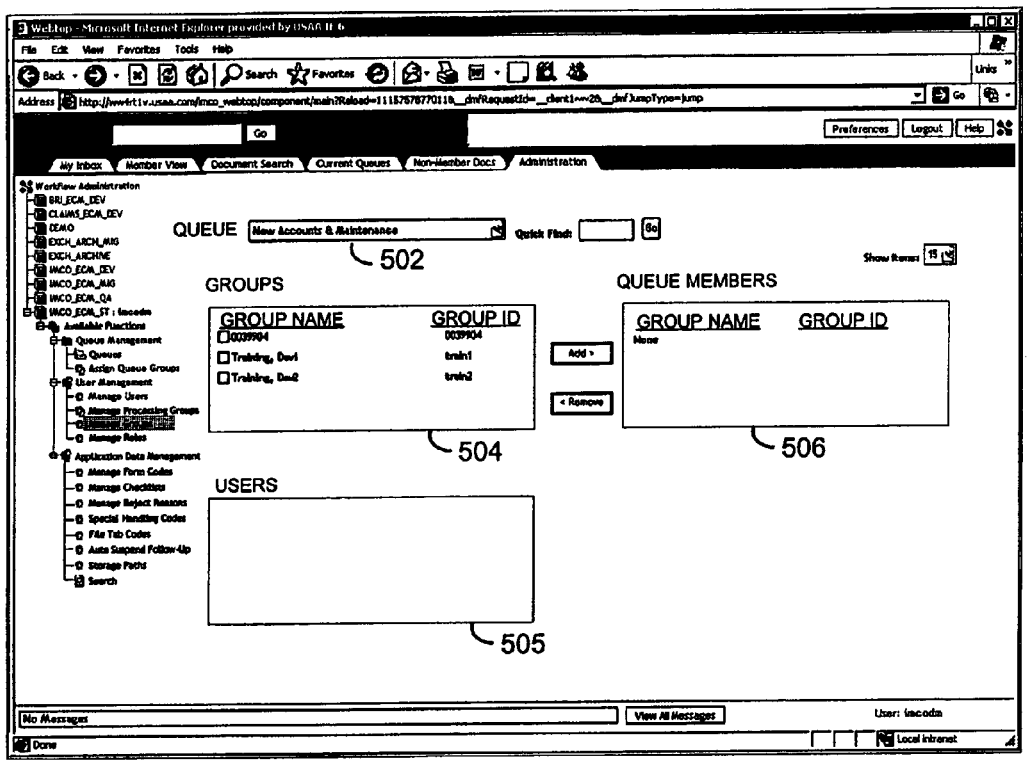
FIG. 5 illustrates a user interface according to an example embodiment.

FIG. 5 illustrates a user interface 500 according to an example embodiment. The user interface 500, in some embodiments, provides abilities to assign and un-assign groups to queues. Some other embodiments of the user interface provides the ability to assign a user to a queue. In yet further embodiments, both users and groups can be assigned to queues. The user interface 500, in some embodiments, is provided to administer data stored in the QUEUE table of FIG. 2.

In some embodiments, the user interface 500 is a queue-work unit management user interface. The work unit in some embodiments is one or more of a group, user, department, company, or other individual, group, or entity. The user interface 500 displays queue-work unit record fields including a queue identifier and one or more work-unit identifiers. The user interface 500 is operable to receive input into the queue-work unit record fields and generate a statement, the execution of which causes input received in the queue-work unit record fields to be stored as a queue-work unit record in a queue-work unit database or table within a database. In some embodiments, the statement is generated in a query language used by a database management system of a database in which the user interface 500 data is stored. In some embodiments, the query language is Structured Query Language ("SQL"). In other embodiments, the query language is a language required by a document management system, such as Documentum Query Language ("DQL"). In some embodiments, the user interface is operable to retrieve an existing queue-work unit record.

In some embodiments, a listing of groups 504 and a listing of users 505 available for assignment to a specific queue 502. Members of a queue are identified 506 and can be added to or deleted via keyboard actions or via drag-and-drop actions between various controls of the user interface 500.

Figure 6:
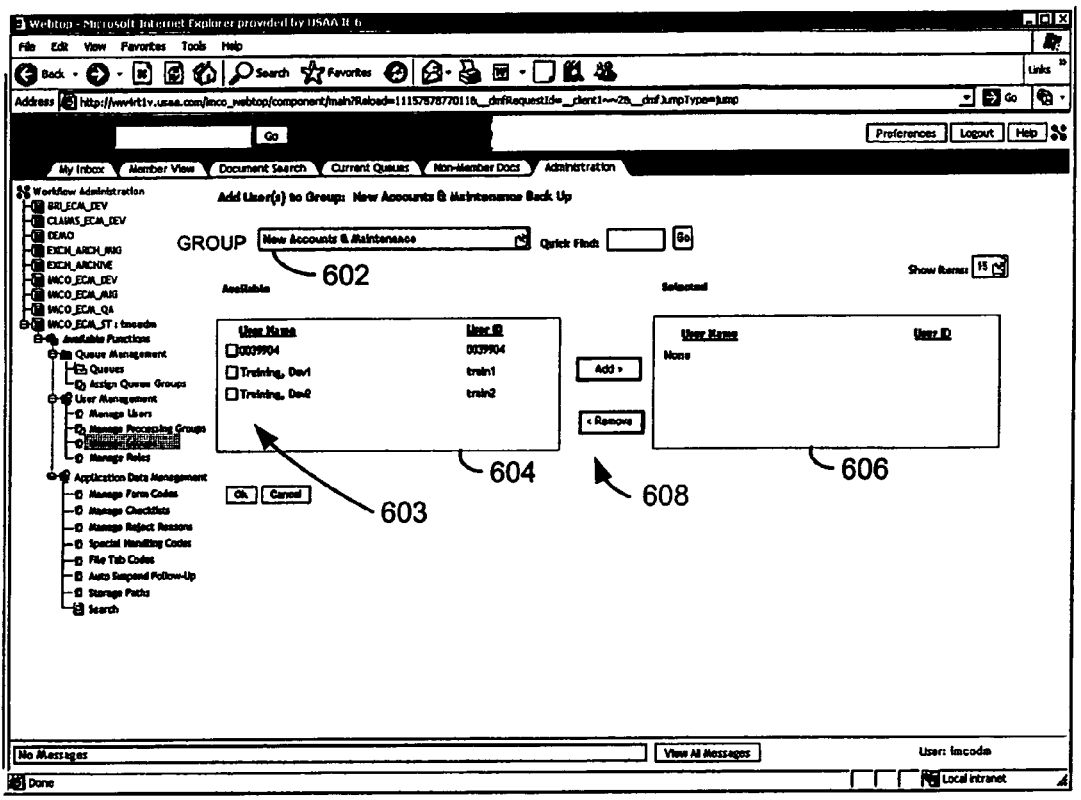
FIG. 6 illustrates a user interface according to an example embodiment.

FIG. 6 illustrates a user interface 600 according to an example embodiment. The user interface 600, in some embodiments, provides abilities to assign and un-assign users to groups. Some further embodiments of the user interface 600 also provide the ability to assign a group to a group. The user interface 600, in some embodiments, is provided to administer data stored in the GROUP table of FIG. 2.

In some embodiments, the user interface 600 is a user-group management user interface including user-group record fields. In some embodiments, the user interface 600 includes a group identifier 602 and one or more user identifiers 603. The user interface 600, in some embodiments, is operable to receive input into the user-group record fields and generate a statement, the execution of which causes input received in the user-group record fields to be stored as a group record.

In some embodiments, the statement is generated in a query language used by a database management system of a database in which the user interface 600 data is stored. In some embodiments, the query language is Structured Query Language ("SQL"). In other embodiments, the query language is a language required by a document management system, such as Documentum Query Language ("DQL").

In some embodiments, a listing of users 604 available for assignment to a group 602 is provided. Users from the listing of users 604 can be added to or deleted from a group via keyboard actions, clicking user interface 600 buttons 608, or via drag-and-drop actions between the listing of users 604 and a listing of group members 606.

FIG. 7 is a block diagram of a method 700 according to an example embodiment. The method 700 includes maintaining a workflow database including template records, wherein a given template record defines a workflow process for one or more document types in a document management system 702. In some embodiments, the given template record includes a form code to associate the given template record with a document type and one or more entities involved in the workflow processing of the document type.

The method 700 further includes providing a template record administration user interface including template record fields, wherein the template record fields include a form code field and one or more entity fields 704. In some embodiments, the template record administration user interface is operable to receive input into the template record fields 706, generate a script, the execution of which will cause input received in the template record fields to be stored as a template record in the workflow database 708, and submit the script to the workflow database 710.

In some embodiments of the method 700, each template record includes a template record identifier. In some such embodiments, the method 700 further includes maintaining a document database, wherein each document in the document database includes a document identifier 712 and maintaining a package database 714. In some embodiments, a package in the package database includes one or more document identifiers, a template record identifier, and data identifying entities that have processed the package.

In some such embodiments, the method 700 further includes executing a workflow process management process 716. One embodiment of the workflow process management process includes monitoring packages in the package database to identify entities that have processed packages based on the data identifying entities that have processed packages 718. This embodiment further includes identifying a next entity to receive a given package as a function of entities defined in a workflow route of a template record referenced by the given package template record identifier 720 and routing the given package to the identified next entity 722.

FIG. 8 is a block diagram of a method 800 according to an example embodiment. In some embodiments, the method 800 includes maintaining a template database including template records 802. In some embodiments, a given template record defines a workflow process for one or more document types in a document management system and each template record includes a template identifier.

The method 800 further includes maintaining a queue database including queue records 804. In some such embodiments, a queue record represents a work unit that performs tasks and each queue record includes a queue identifier. The method 800 also includes maintaining a template-queue database including template-queue records that each define an assignment of one or more queue records to a template record, wherein a template-queue record includes a template identifier and one or more queue identifiers 806.

The method 800 additionally includes providing a template-queue assignment user interface including two or more template-queue record fields, wherein the template-queue record fields include a template identifier and one or more queue identifiers 810. The template-queue assignment user interface, in some embodiments, is operable to receive input into the template-queue record fields 812, generate a script, the execution of which causes input received in the template-queue record fields to be stored as a template-queue record in the template-queue database 814, and submit the script to the template-queue database 816.

In some further embodiments of the method 800, each template record includes a template record identifier. Such embodiments further include maintaining a document database, wherein each document in the document database includes a document identifier 818 and maintaining a package database 820, wherein a package includes one or more document identifiers, a template record identifier, and data identifying queues that have processed the package. These embodiments also include executing a workflow process management module 822.

Executing a workflow process management module 822, in some embodiments, includes monitoring packages in the package database to identify queues that have processed packages based on the data identifying queues that have processed packages 824. Such embodiments also include identifying a next queue to receive a given package as a function of entities defined in a workflow route of a template record referenced by the given package template record identifier 826 and routing the given package to the identified next queue 828.

FIG. 9 is a block diagram of a method 900 according to an example embodiment. The method 900 includes maintaining a user database including user records representative of system users, wherein each record includes a user identifier 902 and maintaining a group database including group records that define one or more system user groups 904. In some embodiments, each group record includes a group identifier and zero to many user identifiers associated with a identifier, wherein a group's members are identified by the universe of user identifiers associated with the group identifier.

The method 900 further includes providing a user-group management user interface including user-group record fields including a group identifier and one or more user identifiers 906. The user-group management user interface, in some embodiments, is operable to receive input into the user-group record fields 908, generate a script, the execution of which causes input received in the user-group record fields to be stored as a group record 910, and submit the script to the group database 912.

In some embodiments, the method 900 further includes maintaining a workflow database including template records, wherein a given template record defines a workflow process for one or more document types in a document management system 914. In some embodiments, the given template record includes a form code to associate the given template record with a document type and one or more groups involved in the workflow processing of the document type. The method 900, in such embodiments, further includes maintaining a document database, wherein each document in the document database includes a document identifier 918 and maintaining a package database 920. In some embodiments, a package includes one or more document identifiers and a template record identifier.

This embodiment of the method 900 further includes executing a workflow process management module 922. In some embodiments, the workflow process management module process includes monitoring packages in the package database to identify a member of the one or more groups from the given template record to process the package as a function of the group database and routing the given package to the identified group member.

FIG. 10 is a block diagram of a method 1000 according to an example embodiment. The example method 1000 includes maintaining a queue database including queue records, wherein queue records include an identifier of a work unit that performs tasks within a document workflow and a queue identifier 1002. The example method 1000 further includes maintaining one or more work unit databases including work unit records, wherein a work unit record includes a work unit identifier 1004 and maintaining a queue-work unit database including queue-work unit records including a queue identifier associated with one or more work unit identifiers, one or more work units assigned to a queue are identified by the one or more work unit identifiers associated with a unique queue identifier 1006.

The example method 1000 also includes providing a queue-work unit management user interface including queue-work unit record fields including a queue identifier and one or more work-unit identifiers 1008. In some embodiments, the queue-work unit management user interface is operable to receive input into the queue-work unit record fields 1010, generate a script, the execution of which causes input received in the queue-work unit record fields to be stored as a queue-work unit record in the queue-work unit database 1012, and submit the script to the queue-work unit database 1014.

Some embodiments of the example method 1000 further include maintaining a workflow database including template records, wherein a given template record defines a workflow process for one or more document types in a document management system 1016. In some embodiments, the given template record includes a form code to associate the given template record with a document type and one or more queues involved in the workflow processing of the document type. Such embodiments further include maintaining a document database, wherein each document in the document database includes a document identifier 1018 and maintaining a package database 1020. In some embodiments, a package includes one or more document identifiers, a template record identifier, and data identifying queues, wherein an identified queue has processed the package.

Additional embodiments of the method 1000 include executing a workflow process management module 1022. In some embodiments, the workflow process management module includes monitoring packages in the package database to identify queues that have processed packages based on the data identifying queues that have processed packages and identifying a next queue to receive a given package as a function of queues defined in a workflow route of a template record referenced by the given package template record identifier. Such embodiments also include routing the given package to the identified next queue.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of these embodiments may be made without departing from the principles and scope of the embodiments as expressed in the subjoined claims.

What is claimed is:

1. A system comprising:
   a processor operable to execute instructions;
   a storage device;
   a memory device holding data including instructions operable on the processor to:
   manage one or more databases with data stored in the storage device,
   the instructions operable on the processor to manage:
   a template database including template records, wherein:
   a given template record defines a workflow process for one or more document types in a document management system, and each template record includes:
   a template record identifier, and
   a form code to associate the given template record with a document type;
   a queue database including queue records, wherein:
   a queue identifier,
   data identifying a group that will perform an action, and
   data identifying rules for assignment to a specific group member; and
   a template-queue database including template-queue records that each define an assignment of one or more queue records to a template record, wherein a template-queue record includes a template identifier, one or more queue identifiers, and an order column wherein the order column identifies a workflow order for routing to a plurality of queues simultaneously; and
   a package database, wherein a package includes:
   one or more document identifiers,
   a template record identifier, and data identifying queues that have processed the package;
provide a template-queue assignment user interface including two or more template-queue record fields, wherein the template-queue record fields include a template identifier and one or more queue identifiers, wherein the template-queue assignment user interface is operable to:
receive input into the template-queue record fields to associate a template identifier of a template with one or more queue identifiers of respective queues,
generate a script, the execution of which causes input received in the template-queue record fields to be stored as a template-queue record in the template-queue database, and
submit the script to the template-queue database; and
provide a workflow process management module, wherein the workflow process management module is operable to:
monitor packages in the package database to identify queues that have processed packages based on the data identifying queues that have processed packages,
identify a next queue to receive a given package as a function of entities defined in a workflow route of a template record referenced by the given package template record identifier; and
route the given package to the identified next queue.

2. The system of claim 1, wherein the template-queue and the template database are tables within a single database.

3. The system of claim 1, wherein the template-queue assignment user interface is further operable to retrieve an existing template-queue record from the template-queue database.

4. The system of claim 1, wherein a work unit is one or more persons capable of performing a unit of work.

5. The system of claim 1, wherein the template-queue records include a sequence field, wherein queue records assigned to a single template are sequentially ordered by the sequence field according to a queue workflow requirement.

6. The system of claim 1, wherein one or more possible values for one or more of the template-queue record fields are provided for user selection by the template-queue assignment user interface.

7. A method comprising:
maintaining a template database on a document management server including template records, wherein:
a given template record defines a workflow process for one or more document types in a document management system, and
each template record includes:
a template identifier, and
a form code to associate the given template record with a document type;
maintaining a queue database including queue records, wherein:
a queue identifier,
data identifying a group that will perform an action, and
data identifying rules for assignment to a specific group member;
maintaining a template-queue database on the document management server including template-queue records that each define an assignment of one or more queue records to a template record, wherein a template-queue record includes a template identifier, one or more queue identifiers, and an order column wherein the order column identifies a workflow order for routing to a plurality of queues simultaneously;
maintaining a package database, wherein a package includes:
one or more document identifiers,
a template record identifier, and
data identifying queues that have processed the package;
providing a template-queue assignment user interface, to a client computer, the client computer being communicatively coupled to the document management server through a network, the template-queue assignment user interface including two or more template-queue record fields, wherein the template-queue record fields include a template identifier and one or more queue identifiers, wherein the template-queue assignment user interface is operable to:
receive input into the template-queue record fields to associate a template identifier of a template with one or more queue identifiers of respective queues,
generate a script, the execution of which causes input received in the template-queue record fields to be stored as a template-queue record in the template-queue database, and
submit the script to the template-queue database; and
providing a workflow process management module, wherein the workflow process management module is operable to:
monitor packages in the package database to identify queues that have processed packages based on the data identifying queues that have processed packages,
identify a next queue to receive a given package as a function of entities defined in a workflow route of a template record referenced by the given package template record identifier; and
route the given package to the identified next queue.

8. The method of claim 7, wherein the template-queue and the template database are tables within a single database.

9. The method of claim 7, wherein the template-queue assignment user interface is further operable to retrieve an existing template-queue record from the template-queue database.

10. The method of claim 7, wherein a work unit is one or more persons capable of performing a unit of work.

11. The method of claim 7, wherein the template-queue records include a sequence field, wherein queue records assigned to a single template are sequentially ordered by the sequence field according to a queue workflow requirement.

12. The method of claim 7, wherein each template record includes a template record identifier, the method further comprising:
maintaining a document database, wherein each document in the document database includes a document identifier.

13. The method of claim 7, wherein one or more possible values for one or more of the template-queue record fields are provided for user selection by the template-queue assignment user interface.

14. A machine-readable storage medium, with instructions thereon that when processed, result in a machine:
maintaining a template database including template records, wherein:
a given template record defines a workflow process for one or more document types in a document management system, and
each template record includes:
a template identifier, and
a form code to associate the given template record with a document type;
maintaining a queue database including queue records, wherein:

a queue identifier, data identifying a group that will perform an action, and data identifying rules for assignment to a specific group member;

maintaining a template-queue database including template-queue records that each define an assignment of one or more queue records to a template record, wherein a template-queue record includes a template identifier, one or more queue identifiers, and an order column wherein the order column identifies a workflow order for routing to a plurality of queues simultaneously;

maintaining a package database, wherein a package includes:

one or more document identifiers, a template record identifier, and data identifying queues that have processed the package;

providing a template-queue assignment user interface including two or more template-queue record fields, wherein the template-queue record fields include a template identifier and one or more queue identifiers, wherein the template-queue assignment user interface is operable to:

receive input into the template-queue record fields to associate a template identifier of a template with one or more queue identifiers of respective queues, generate a script, the execution of which causes input received in the template-queue record fields to be stored as a template-queue record in the template-queue database, and submit the script to the template-queue database; and providing a workflow process management module, wherein the workflow process management module is operable to:

monitor packages in the package database to identify queues that have processed packages based on the data identifying queues that have processed packages, identify a next queue to receive a given package as a function of entities defined in a workflow route of a template record referenced by the given package template record identifier; and route the given package to the identified next queue.

15. The machine-readable storage medium of claim 14, wherein the template-queue assignment user interface is further operable to retrieve an existing template-queue record from the template-queue database.

16. The machine-readable storage medium of claim 14, wherein a work unit is one or more persons capable of performing a unit of work.

17. The machine-readable storage medium of claim 14, wherein the template-queue records include a sequence field, wherein queue records assigned to a single template are sequentially ordered by the sequence field according to a queue workflow requirement.

18. The machine-readable storage medium of claim 14, wherein each template record includes a template record identifier, the instructions further operable to result in the machine:

maintaining a document database, wherein each document in the document database includes a document identifier;

maintaining a package database, wherein a package includes:

one or more document identifiers, a template record identifier, and data identifying queues that have processed the package; and executing a workflow process management module, wherein the workflow process management module process includes:

monitoring packages in the package database to identify queues that have processed packages based on the data identifying queues that have processed packages, identifying a next queue to receive a given package as a function of entities defined in a workflow route of a template record referenced by the given package template record identifier; and routing the given package to the identified next queue.

19. The machine-readable storage medium of claim 14, wherein one or more possible values for one or more of the template-queue record fields are provided for user selection by the template-queue assignment user interface.

* * * * *